United States Patent

Prete, Jr. et al.

[11] Patent Number: 4,510,651
[45] Date of Patent: Apr. 16, 1985

[54] RATCHET BUCKLE WITH A REMOVABLE OPERATING LEVER

[75] Inventors: Ernest Prete, Jr., Woodland Hills; Howard Knox, Simi, both of Calif.

[73] Assignee: Ancra Corporation, El Segundo, Calif.

[21] Appl. No.: 460,078

[22] Filed: Jan. 21, 1983

[51] Int. Cl.³ .............................................. B25B 25/00
[52] U.S. Cl. ................................. 24/68 R; 16/114 R; 24/68 CD; 74/544; 254/217; 254/237; 254/380
[58] Field of Search .... 16/114 R, DIG. 24, DIG. 25, 16/DIG. 40, DIG. 41; 254/217, 218, 223, 237, 238, 239, 240, 380, DIG. 3; 74/156, 544, 546; 24/68 R, 68 A, 68 B, 68 BT, 68 CD, 68 CT, 68 D, 69 R, 69 CT, 69 ST, 69 T, 69 TT, 70 CT, 70 ST, 70 T, 70 TT, 71.1, 71.2, 71.3, 269, 272, 273, 285; 410/11, 12, 100, 103

[56] References Cited

U.S. PATENT DOCUMENTS

| 956,328 | 4/1910 | Forshee | 254/217 X |
|---|---|---|---|
| 1,532,043 | 3/1925 | Craft et al. | 74/544 X |
| 2,363,138 | 11/1944 | Moore | 24/71.2 X |
| 2,519,536 | 8/1950 | Barbagelata | 74/544 X |
| 2,738,204 | 3/1956 | Ibey | 254/223 X |
| 3,100,120 | 8/1963 | Clearly | 74/544 X |
| 3,175,806 | 3/1965 | Prete, Jr. | 24/68 CD |
| 3,180,623 | 4/1965 | Huber | 24/68 CD |
| 4,199,182 | 4/1980 | Sunesson | 24/68 CD X |

Primary Examiner—William E. Lyddane
Assistant Examiner—James R. Brittain
Attorney, Agent, or Firm—Edward A. Sokolski

[57] ABSTRACT

A removable operating lever is provided for a ratchet buckle device for tightening and tensioning straps. The ratchet buckle has a bifurcated frame member with a pair of oppositely positioned parallel arms between which a reel member and ratchet wheels are rotatably mounted and employs a bifurcated handle member having a pair of oppositely positioned parallel arms rotatably mounted on the reel. The handle has a ratchet drive plate which engages the teeth of the ratchet wheels such that when the handle is actuated, the reel is rotatably driven. The buckle has a cross member on the handle member thereof which has mounting means thereon for mounting an elongated lever member which can be employed to actuate the handle member.

3 Claims, 6 Drawing Figures

RATCHET BUCKLE WITH A REMOVABLE OPERATING LEVER

This invention relates to ratchet buckles for tightening and tensioning strap, and more particularly to such a ratchet buckle which has an elongated operating lever attached to the handle thereof for use in actuating such handle.

Ratchet buckles for tightening and tensioning strap are used extensively, particularly in tying down cargo loaded on a vehicle. Such ratchet buckles are described in U.S. Pat. No. 2,889,136 issued to E. Prete, Jr., a co-inventor of the present invention, and in U.S. Pat. No. 4,185,360, issued to said Ernest Prete, Jr. et al. It has been found that with such prior art ratchet buckles it is sometimes difficult to obtain sufficient tightening force on the handle. The device of the present invention overcomes this shortcoming of prior art ratchet buckles by providing an operating lever which may be removably attached to the handle of the ratchet buckle and utilized when needed to provide extra leverage for tightening the ratchet buckle.

This end result is achieved in the present invention by modifying the existing prior art buckles to provide a cross member which is adapted to receive an elongated bar type operating lever for operating the handle. This operating lever is designed to operate in conjunction with the cross member in the ratchet buckle handle to enable easy and rapid installation of the lever on the operating handle as well as its removal therefrom after the proper tensioning has been accomplished. In view of its easy installation and removal, a single operating lever can be used for tensioning a number of different ratchet buckles such that only a single such lever is needed at each installation. However, if so desired for particular application requirements, the lever can be semi-permanently installed in the handle by means of an attachment bolt.

It is therefore an object of this invention to facilitate the tensioning operation of ratchet buckles.

It is a further object of this invention to provide a lever for use in tightening and tensioning ratchet buckles which can be readily installed and removed for use on a plurality of different ratchet buckles.

Other objects of this invention will become apparent as the description proceeds in connection with the accompanying drawings of which:

Figure 1:
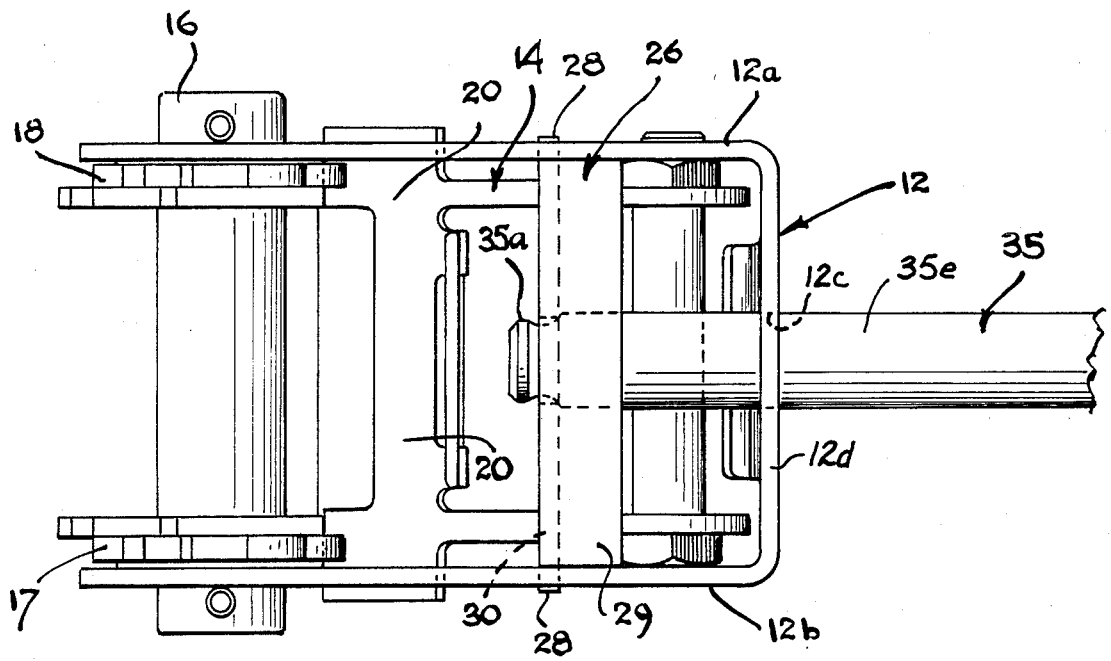
FIG. 1 is a top plan view of the device of the invention.
Figure 2:
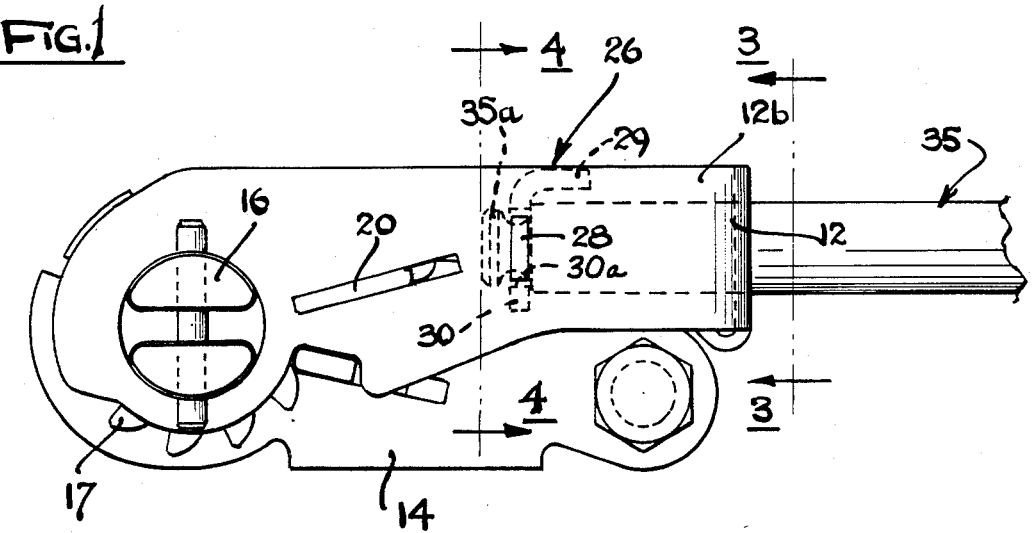
FIG. 2 is a side elevational view of the device of the invention.
Figure 3:
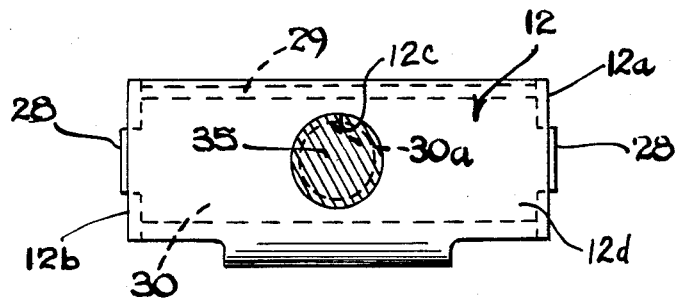
FIG. 3 is a cross-sectional view taken along the plane indicated by 3—3 in FIG. 2.
Figure 4:
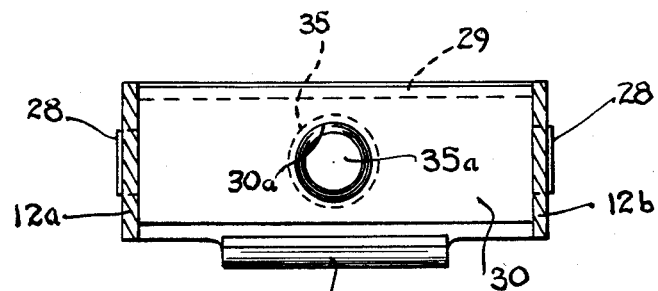
FIG. 4 is a cross-sectional view taken along the plane indicated by 4—4 in FIG. 2.
Figure 5:
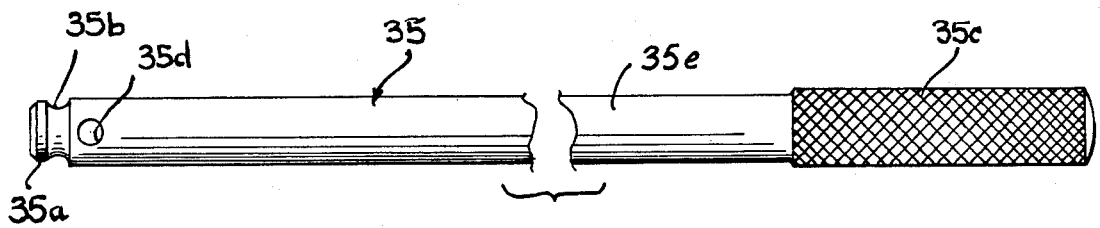
FIG. 5 is a top plan view of the lever bar employed in the device of the invention.

Referring now to the drawings, the ratchet buckle includes a bifurcated frame member 14 having a pair of oppositely positioned parallel arms and a bifurcated handle member 12 having a pair of parallel arms 12a and 12b. The handle member is pivotally supported on the reel 16 and rotatably drives the reel, on which the strap to be tightened is wound, by virtue of the engagement with ratchet wheels 17 and 18 of ratchet drive plate 20 which is slidably supported on the handle and is spring urged into engagement with the ratchet wheels. This device is fully described in aforementioned U.S. Pat. No. 4,185,360, which is incorporated herein by reference.

Cross member 26 extends between the arms 12a and 12b of handle 12 and has stud portions 28 on the opposite ends thereof which extend through mating apertures formed in arms 12a and 12b. Cross member 26 includes a horizontal arm portion 29 and a vertical arm portion 30 which extends substantially normally from the horizontal arm portion. Formed in vertical arm portion 30 near the center thereof is an aperture 30a. Elongated operating lever 35 has a knob shaped end portion 35a approximately equal in diameter to aperture 30a in plate 30 with a recessed portion 35b between the knob portion and the main body 35e of the lever. The knob portion thus can be readily inserted through aperture 30a in plate 30 to bring the recessed portion opposite the edges of the apertured portion of the plate; the diameter of the main body of the cylindrical lever 35 being greater than that of aperture 30a. Lever 35 is preferably cylindrical in form and has a knurled handle portion 35c. Typically, this lever has a length of the order of 16". The main body portion 35e of the lever is fitted through aperture 12c formed in cross arm 12d of the handle.

Thus, operating lever 35 can readily be installed and removed from the handle portion 12 of the ratchet buckle and a single such operating lever can be employed with a number of ratchet buckles. Cross member 26 not only provides a connection for operating lever 35, but also acts as a stiffener for the handle 12.

Figure 6:
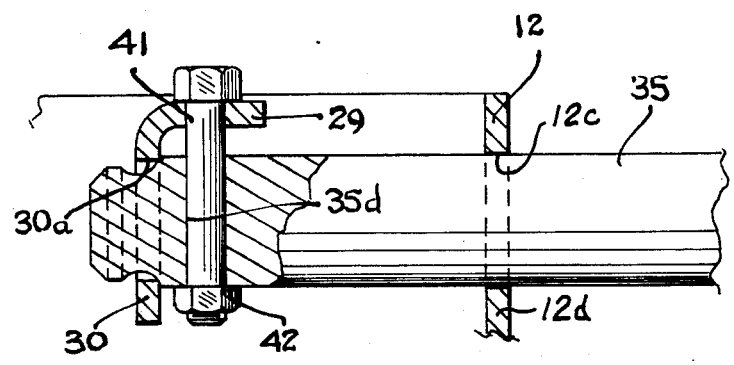
FIG. 6 is a view illustrating an alternate configuration of the device of the invention in which the lever bar member is semi-permanently attached to the ratchet buckle handle.

Referring now to FIG. 6, if so desired, lever 35 can be semipermanently attached to the handle 12 by means of threaded bolt 41 which fits through an aperture formed in horizontal cross arm 29 and an aperture 35d formed in lever arm 35 and is retained to the lever arm by means of nut 42.

While the invention has been described and illustrated in detail, it is to be clearly understood that this is intended by way of illustration and example only and is not to be taken by way of limitation, the spirit and scope of the invention being limited only by the terms of the following claims.

We claim:

1. In a ratchet buckle for tightening and tensioning straps having a reel and a pair of ratchet wheels fixedly connected therto, a bifurcated handle member having a pair of oppositely positioned parallel arms connected together by a cross arm, said parallel arms being rotatably mounted on the reel and a ratchet drive plate which engages the ratchet wheels such that when the handle member is actuated the wheel is rotatably driven, the improvement being means for manipulating the handle member comprising:

a cross member extending between the arms of the handle member and connected thereto, said cross member having an aperture formed therein, and an elongated operating lever having one end portion thereof fitted into the aperture formed in the cross member, a main body portion greater in diameter than said aperture, a knob portion at said one end portion and a recessed portion between the knob portion and main body portion, the knob portion having a diameter approximately equal to that of said aperture and said recessed portion having a diameter less than that of said aperture, the recessed portion being opposite the edges of said aperture with the lever in its installed portion, the cross arm of the handle member having an aperture formed therein through which the main body portion of the lever is fitted.

2. The ratchet buckle of claim 1 wherein said cross member includes a horizontal arm portion and a vertical arm portion extending substantially normally from the horizontal arm portion, the aperture being formed in the vertical arm portion.

3. The ratchet buckle of claim 2 and further including an aperture formed in said lever near the recessed portion thereof and an aperture formed through the horizontal arm portion of said cross member, and means fitted through the aperture in the horizontal arm portion and the aperture of said lever for retaining the lever to the handle member.

* * * * *